(12) United States Patent
Kim et al.

(10) Patent No.: US 11,742,947 B1
(45) Date of Patent: Aug. 29, 2023

(54) NOISE ESTIMATION IN OPTICAL NETWORKS

(71) Applicant: FUJITSU LIMITED, Kawasaki (JP)

(72) Inventors: Inwoong Kim, Allen, TX (US); Olga I. Vassilieva, Plano, TX (US); Paparao Palacharla, Richardson, TX (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/691,045

(22) Filed: Mar. 9, 2022

(51) Int. Cl.
*H04B 10/079* (2013.01)
*H04B 10/077* (2013.01)

(52) U.S. Cl.
CPC ... *H04B 10/07953* (2013.01); *H04B 10/0775* (2013.01)

(58) Field of Classification Search
None
See application file for complete search history.

(56) References Cited

U.S. PATENT DOCUMENTS

| 6,396,051 B1* | 5/2002 | Li | H04B 10/07953 398/9 |
|---|---|---|---|
| 2013/0209091 A1* | 8/2013 | Mateosky | H04B 10/516 398/25 |

OTHER PUBLICATIONS

Cai et al., "Direct Measurement of Broadband FWM Induced Noise in Dispersion Uncompensated Systems", Jun. 17, 2013, Optical Society of America, OFC/NFOEC Technical Digest, 3 pages (Year: 2013).*
Machine-Learning Method for Quality of Transmission Prediction of Unestablished Lightpaths, JOCN, 2018.
Direct Measurement of Broadband FWM Induced Noise in Dispersion Uncompensated Systems, OFC 2019.

* cited by examiner

*Primary Examiner* — David W Lambert
(74) *Attorney, Agent, or Firm* — Maschoff Brennan

(57) ABSTRACT

A method may include directing transmission of a first optical noise signal along a frequency channel of an optical network at a first power level. The first optical noise signal may include a notch at a frequency in the frequency channel. The method may also include while transmission of the first optical noise signal occurs along the frequency channel, obtaining a measurement of a first noise level at the frequency and obtaining a measurement of a second noise level at the frequency. The frequency channel may include a second power level when the measurement of the second noise level is obtained and the second power level may be different than the first power level. The method may further include estimating a noise level of an optical data signal transmitted along the frequency channel based on the first noise level and the second noise level.

20 Claims, 8 Drawing Sheets

NOISE ESTIMATION IN OPTICAL NETWORKS

FIELD

The embodiments discussed in the present disclosure are related to estimating noise in optical networks.

BACKGROUND

An optical network may include multiple different optical paths between sources and destinations within the optical network. Each of the paths may include different amounts of optical noise. The amount of optical noise may affect a type of optical signal that may be transmitted along each of the different optical paths.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In an example embodiment, a method may include directing transmission of a first optical noise signal along a frequency channel of an optical network at a first power level. In some embodiments, the first optical noise signal may include a notch at a frequency in the frequency channel. The method may also include while transmission of the first optical noise signal occurs along the frequency channel, obtaining a measurement of a first noise level at the frequency in the frequency channel and obtaining a measurement of a second noise level at the frequency in the frequency channel. In some embodiments, the frequency channel may include a second power level when the measurement of the second noise level is obtained, and the second power level may be different than the first power level. The method may further include estimating a noise level of an optical data signal transmitted along the frequency channel based on the first noise level and the second noise level.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
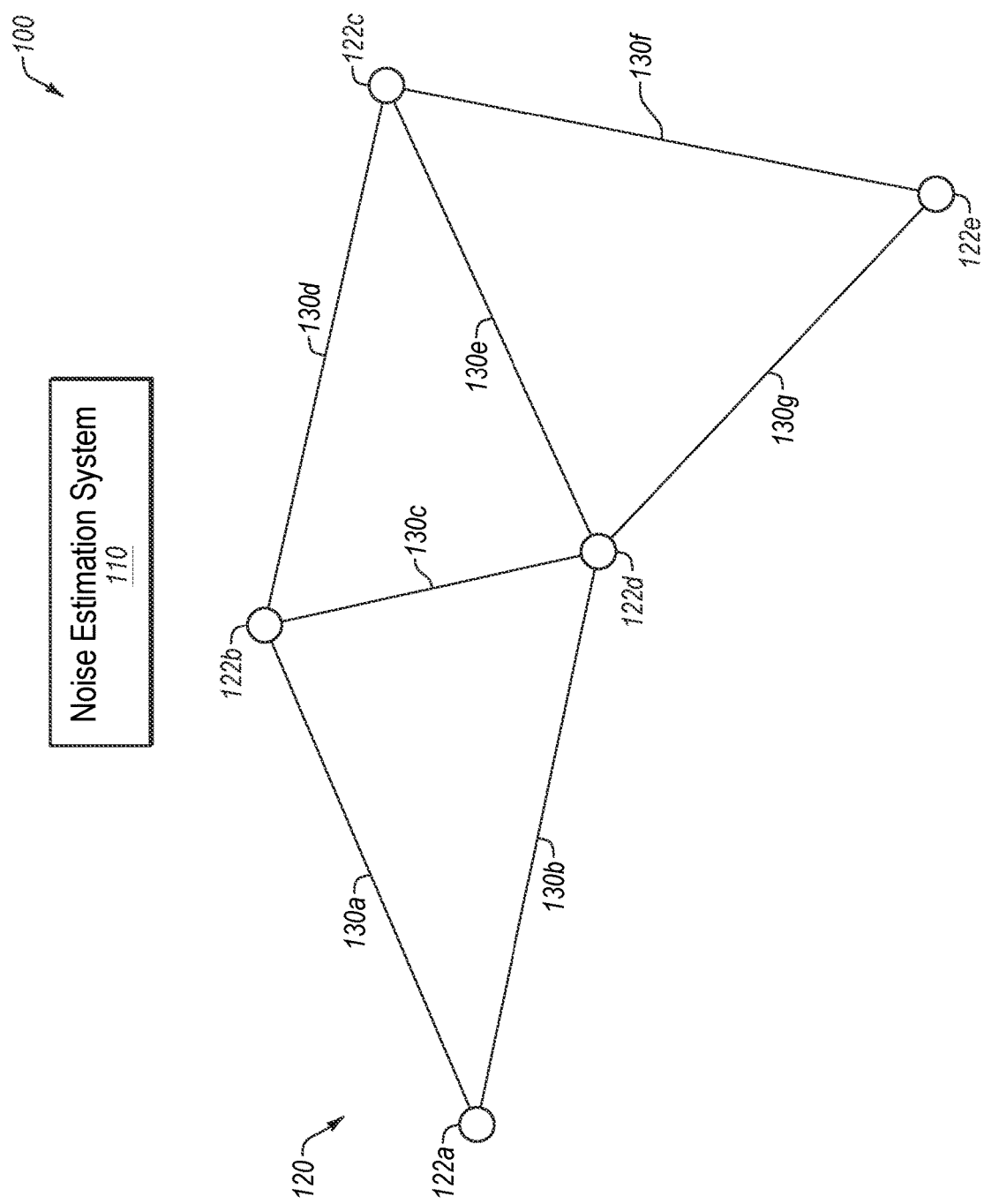
FIG. 1 illustrates an example environment for estimating noise of optical signals in an optical network.

An optical network may be configured to support propagation of optical signals between a source and destination. In some circumstances, an optical network may be configured to support multiple different configurations of optical signals. For example, a configuration of an optical signals may be based on a power level, modulation format, and/or baud rate of the optical signal. In some circumstances, it may be helpful to understand how a particular optical signal configuration may perform along a particular optical path. To understand how an optical signal configuration may perform along an optical path, a signal-to-noise ratio (SNR) of the optical signal along the optical path may be determined.

In some circumstances, a SNR of an optical path may be determined based on optical noise along the optical path. Some optical noise may be caused by the optical elements within the optical path. Alternately or additionally, some optical noise may be caused by optical signals within the optical path. For example, a first signal may experience some optical noise, such as an intra-channel nonlinear interference (NLI) noise, along a first optical path, which may be the result of FWM between frequency components in the signal itself. In some circumstances it may be difficult to determine intra-channel NLI noise.

Some embodiments of the current disclosure may be directed to measuring noise along an optical path, including an intra-channel NLI noise, without affecting optical signals that may be propagating along the optical path.

In some embodiments, to measure noise along an optical path, a first optical noise signal may be transmitted along a frequency channel of the optical path. The first optical noise signal may include a notch at a frequency within the frequency channel. Other optical signals may be propagating along the optical path in frequency channels adjacent to the frequency channel of the first optical signal.

In some embodiments, a measurement may be obtained of a spectral power level at the frequency within the frequency channel. The measurement may represent a noise level of the frequency channel. In these and other embodiments, the measurement may be used to determine an intra-channel NLI noise of the frequency channel. Other measurements may also be obtained to determine other noises, such as an amplified spontaneous emission (ASE) noise and other types of NLI noise, such as inter-channel NLI noise caused by optical signals propagating along the optical path in frequency channels adjacent to the frequency channel. As a result, a noise level of the frequency channel in the optical path may be obtained without adjusting power levels of the other optical signals propagating along the optical path.

In some embodiments, the noise level of the frequency channel in the optical path may be used to determine a SNR for an optical signal that may propagate along the optical path. Using the SNR, an understanding regarding how an optical signal configuration may perform along the optical path may be determined.

Turning to the figures, FIG. 1 illustrates an example environment 100 for estimating noise of optical signals in an optical network, according to at least one embodiment in the present disclosure. The environment 100 may include a noise estimation system 110 and an optical network 120. The optical network 120 may include a first network node 122a, a second network node 122b, a third network node 122c, a fourth network node 122d, and a fifth network node 122e, referred to collectively as the optical nodes 122. The optical network 120 may further include a first optical link 130a, a second optical link 130b, a third optical link 130c, a fourth optical link 130d, a fifth optical link 130e, a sixth optical link 130f, and a seventh optical link 130g, referred to collectively as the optical links 130. Each of the optical links 130 may extend between two of the optical nodes 122 as illustrated in FIG. 1.

In some embodiments, each of the optical links 130 may include an optical fiber that connects a transmitter in one network node and a receiver in another network node of the optical network 120. For example, the first optical link 130a may include a transmitter in the first network node 122a, a receiver in the second network node 122b, and an optical fiber between the first network node 122a and the second network node 122b that is coupled between the transmitter and the receiver. In some embodiments, the first optical link 130a may include other optical elements, such as repeaters, wave division multiplexers, amplifiers, and other optical elements.

In some embodiments, the optical fibers that connect optical elements in the optical network 120 may be configured to carry optical signals and may be any type of optical fiber. For example, the optical fiber may be a dispersion-shifted fiber (DSF), a single-mode optical fiber (SMF), or a multi-mode optical fiber (MMF), among other types of optical fibers. The optical fibers may have varying lengths, such as, any number of feet, meters, or kilometers. For example, the optical fiber may have a length that ranges between 1 inch and 300 or more kilometers.

An optical signal may be transmitted within the optical network 120. The optical signal may follow an optical path through the optical network 120. The optical path may include any number of optical elements within the optical network 120. For example, an optical path may commence at the first network node 122a and end at the third network node 122c and include the first optical link 130a, the second network node 122b, the third optical link 130c, the fourth network node 122d, and the fifth optical link 130e. Thus, the optical path may include multiple optical elements.

An optical path may include a frequency bandwidth along which optical signals may propagate. The frequency bandwidth may be divided into frequency channels. An optical signal may traverse the optical path in a frequency channel. Multiple types of optical signals may traverse the optical path. For example, optical signals with varying power levels, baud rates, and modulation formats may be used within the optical network 120 along a given optical path of a given length.

A frequency channel along an optical path may also include noise. The noise may include ASE noise due to the network elements along the path. The noise may also include NLI noise due to optical signals propagating along the optical path.

In some circumstances, it may be beneficial to understand a SNR for a type of optical signal that may traverse an optical path before the optical signal is sent along the path. For example, understanding the SNR for a type of optical signal may allow a type of optical signal to be selected that has a SNR that meets requirements for a data connection between the source and destination in the optical network 120.

The noise estimation system 110 may include any configuration of hardware, such as processors, servers, and storage servers that are networked together and configured to perform a task. For example, the noise estimation system 110 may include one or multiple computing systems, such as multiple servers that each include memory and at least one processor.

In some embodiments, the noise estimation system 110 may be configured to estimate a noise along an optical path in the optical network 120 for multiple types of optical signals. By estimating the noise, the SNR of the multiple types of optical signal may be determined. Based on the SNR of the multiple types of optical signals, an optical signal may be selected to be transmitted along the optical path.

The noise estimation system 110 may be configured to estimate optical noise for a frequency channel of an optical path. In particular, the noise estimation system 110 may estimate optical noise for the frequency channel of the optical path with respect to a particular type of optical signal.

In some embodiments, to estimate the optical noise, the noise estimation system 110 may obtain a first noise level at a frequency of the frequency channel. In these and other embodiments, the first noise level may be measured when no optical signal is being transmitted along the frequency channel. In these and other embodiments, one or more other optical signals, such as an optical data signal or an optical noise signal, may be transmitted in the optical path in frequency channels adjacent to the frequency channel in which the first noise level is measured.

Alternately or additionally, the first noise level may be measured when an optical noise signal is being transmitted along the frequency channel at a first power level. The optical noise signal may include a notch at the frequency at which the first noise level is measured.

In some embodiments, the noise estimation system 110 may also be configured to obtain a second noise level at the frequency of the frequency channel. The second noise level may be measured while the optical noise signal is transmitted along the frequency channel at a second power level that is higher than the first power level. In addition, the second noise level may be measured when transmission of one or more other optical signals is occurring in the optical path in frequency channels adjacent to the frequency channel in which the optical noise signal propagates.

In some embodiments, the noise estimation system 110 may also be configured to determine a third noise level based on a difference between the first noise level and the second noise level. In these and other embodiments, the estimated noise level of the frequency channel with respect to the particular type of optical signal may be based on the difference between the first noise level and the second noise level.

The noise estimation system 110 may be configured to use the estimated noise level to determine a SNR for the particular type of optical signal when propagated along the frequency channel. In these and other embodiments, the noise estimation system 110 may also determine a SNR for other types of optical signals when propagating along the frequency channel. The noise estimation system 110 may select one of the types of optical signals based on the SNR for each of the optical signals.

Figure 2:
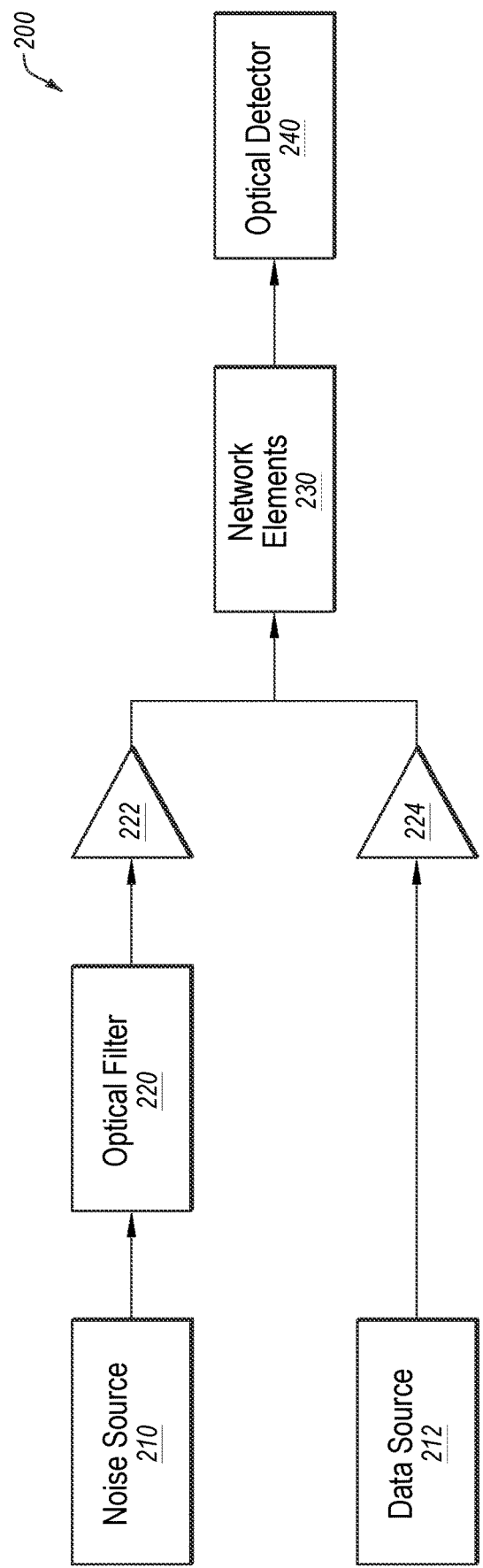
FIG. 2 illustrates elements of an example optical network.

Modifications, additions, or omissions may be made to the environment 100 without departing from the scope of the present disclosure. For example, in some embodiments, the optical network 120 may include FIG. 2 illustrates elements of an example optical network 200, according to at least one embodiment in the present disclosure. The optical network 200 may include a noise source 210, an optical filter 220, a data source 212, a first amplifier 222, a second amplifier 224, network elements 230, and an optical detector 240.

The optical network 200 may be an example of the optical network 120 of FIG. 1. The network elements 230 may be examples of elements discussed in FIG. 1, such as the optical nodes 122, the optical links 130, and the elements within the optical nodes 122 and the optical links 130, such as the optical fiber, repeaters, wavelength division multiplexers, transmitter, receivers, and transponders, among others.

Figure 3A:
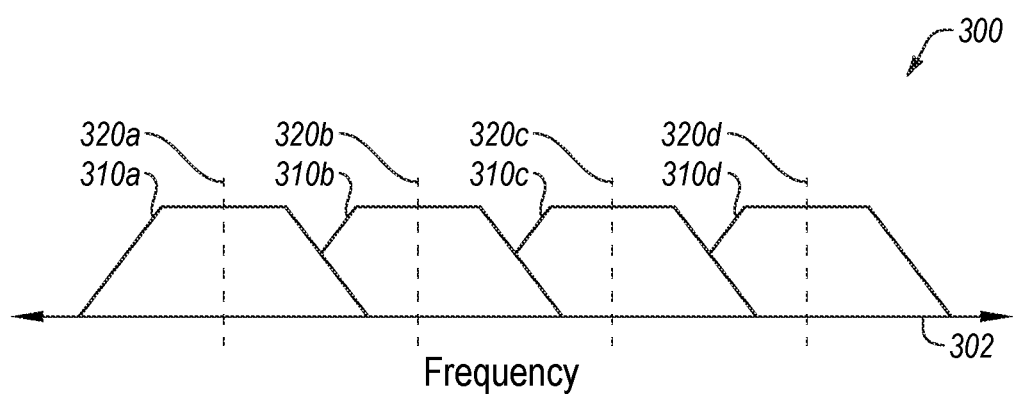
FIGS. 3A-C illustrate example optical signal diagrams.

The optical network 200 may be configured to support multiple optical signals simultaneously. Each of the optical signal may be configured to traverse a frequency channel within the optical network 200. For example, a first optical signal may be transmitted in a first frequency channel and a second optical signal may be transmitted in a second frequency channel. FIG. 3A illustrates an example optical signal diagram 300 that illustrates the frequency channels of an optical network, according to at least one embodiment in the present disclosure. For example, FIG. 3A may illustrate frequency channels that may be part of the optical network 200 of FIG. 2.

The diagram 300 may include a frequency spectrum 302 and a plurality of frequency channels including a first channel 310a, a second channel 310b, a third channel 310c, and a fourth channel 310d, referred to collectively as the channels 310. Each of the channels 310 may be centered on center frequencies 320. For example, the first channel 310a may be centered on a first center frequency 320a, the second channel 310b may be centered on a second center frequency 320b, the third channel 310c may be centered on a third center frequency 320c, and the fourth channel 310d may be centered on a fourth center frequency 320d. As illustrated, each of the channels 310 includes a similar bandwidth, however, each of the channels 310 may include different bandwidths or some of the channels 310 may include the same bandwidths and other of the channels 310 may include different bandwidths.

As illustrated, some of the channels 310 may be adjacent other channels 310. For example, the first channel 310a may be adjacent to the second channel 310b. In some embodiments, adjacent channels may include frequencies that are directly adjacent or have some overlap in frequencies. Alternately or additionally, adjacent channels may be channels with no channels therebetween.

In some embodiments, each of the channels 310 may be configured to carry an optical signal. The optical signal may include similar bandwidth as the channel 310 which carries the optical signal. In these and other embodiments, each of the channels 310 may carry an optical signal simultaneously such that each channel 310 carries a separate optical signal at the same time or in overlapping time periods.

In some embodiments, given the bandwidths of the channels 310, the center frequencies 320 of the channels 310 may be located with respect to each other that propagation of an optical signal in one channel may cause noise in another channel, such as, inter-channel NLI noise. Alternately or additionally, propagation of an optical signal within a channel may cause NLI noise in the channel. The NLI noise caused by propagation of an optical signal within a channel may be referred to as intra-channel noise.

As an example, the bandwidths of the channels 310 may range between 1 and 500 GHz and the center frequencies 320 of the channels may be between 100 THz and 1000 THz or other ranges of frequencies. Modifications, additions, or omissions may be made to the diagram 300 without departing from the scope of the present disclosure.

Returning to the discussion of FIG. 2, in general, the optical network 200 may be configured to generate an optical noise signal with a notch, to transmit the optical noise signal in a frequency channel of the optical network 200, and to obtain measurements of noise levels within the frequency channel. Based on the noise levels, an estimate of SNR of an optical signal that propagates through the frequency channel may be determined.

In some embodiments, the noise source 210 may be configured to generate an optical noise signal. The optical noise signal may be an optical signal that is composed of noise. The noise may be ASE type noise. The optical noise signal may have a center frequency at a frequency that may be transmitted along the network elements 230 within a first frequency channel of the network elements 230. The noise source 210 may provide the optical noise signal to the optical filter 220.

In some embodiments, the optical filter 220 may be configured to filter the optical noise signal. For example, the optical filter 220 may be configured to apply a notch filter to the optical noise signal to generate a filtered optical noise signal. The notch filter may produce one or more notches to the optical noise signal at one or more frequencies. The notches may be frequency bands within a bandwidth of the optical noise signal that include a lower power level than other frequencies within the bandwidth of the optical noise signal outside of the notches. In some embodiments, the power level of frequencies within the notch may be at least one order of magnitude lower than the power level of frequencies outside the notch. In these and other embodiments, a frequency within a frequency band of a notch, such as a center frequency of a frequency band of a notch, may have a lowest power level of the frequencies within the optical noise signal. In some embodiments, the center frequency of the frequency band of a notch may be referred to as the frequency of the notch.

Figure 3B:
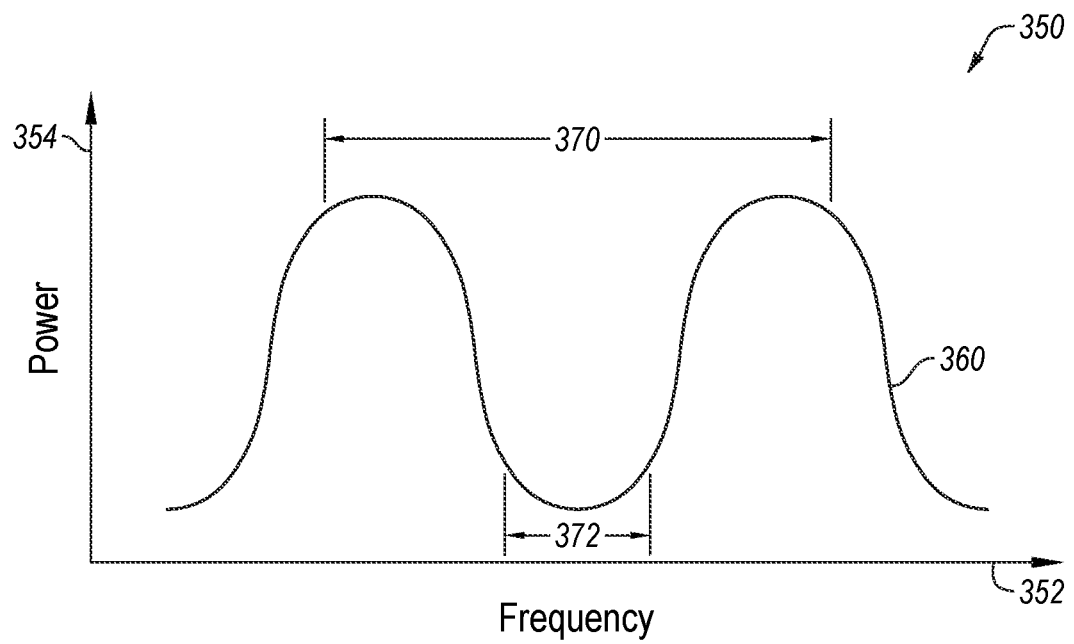

FIG. 3B illustrates an example optical signal diagram 350 of a filtered optical noise signal with a notch, according to at least one embodiment in the present disclosure. The diagram 350 may illustrate a filtered optical noise signal 360 graphed with respect to an x-axis 352 and a y-axis 354. In some embodiments, the x-axis 352 may represent a frequency of the filtered optical noise signal 360. In these and other embodiments, the y-axis 354 may represent a power level of the filtered optical noise signal 360.

The diagram 350 further illustrates a 3 db bandwidth 370 of the filtered optical noise signal 360 and a bandwidth 372 of a notch at the filtered optical noise signal 360. As illustrated, the frequencies of the notch within the filtered optical noise signal 360 may have a lower power level than the frequencies of the filtered optical noise signal 360 outside of the notch within the bandwidth 370 of the filtered optical noise signal 360.

Returning to the discussion of FIG. 2, the optical filter 220 may provide the filtered optical noise signal to the first amplifier 222. In some embodiments, the first amplifier 222 may be configured to amplify and transmit the filtered optical noise signal in a frequency channel along an optical path through the network elements 230. In these and other embodiments, the first amplifier 222 may be configured to amplify the filtered optical noise signal to one or more power levels. In some embodiments, the first amplifier 222 may be an erbium-doped fiber amplifier or other type of optical amplifier.

In some embodiments, the data source 212 may be configured to generate one or more optical data signals. The optical data signals may be optical signals that are configured to carry data. The data source 212 may provide the optical data signals to the second amplifier 224. The second amplifier 224 may be configured to amplify and transmit the optical data signal in frequency channels adjacent to the frequency channel carrying the filtered optical noise signal along the entire optical path or portion of the optical path through the network elements 230. In these and other embodiments, the second amplifier 224 may be configured to amplify the optical data signals to a one or more power levels. In some embodiments, the second amplifier 224 may be an erbium-doped fiber amplifier or other type of optical amplifier. As such, both the optical data signals and the filtered optical noise signal may be propagating through the network elements 230 at the same time.

In some embodiments, the optical detector 240 may be configured to measure noise at frequencies within the optical network 200. For example, the optical detector 240 may be configured to measure a power level of noise at a frequency of a notch of the filtered optical noise signal.

An example operation of the optical network 200 to estimate a noise of an optical signal is now provided.

In some embodiments, the optical detector 240 may be configured to measure a first noise level at a frequency of the notch of the filtered optical noise signal. The optical detector 240 may measure the first noise level when optical data signals are being transmitted by the second amplifier 224 through the network elements 230. In some embodiments, the optical detector 240 may measure the first noise level when the filtered optical noise signal is not being transmitted. Alternately or additionally, the optical detector 240 may measure the first noise level when the filtered optical noise signal is being transmitted. In these and other embodiments, the optical detector 240 may measure the first noise level when the filtered optical noise signal is being transmitted at a first power level. The first power level may be low such that the intra-channel NLI noise is small. For example, the first power level may be low such that the intra-channel NLI noise is small enough to not be consider in a typical SNR calculation that may be used when making decisions about transmission of an optical signal. The first noise level may include ASE noise and NLI noise due to transmission of the other data signals.

In these and other embodiments, the optical detector 240 may also be configured to measures a second noise level at the frequency of the notch of the filtered optical noise signal when the filtered optical noise signal is transmitted at a second power level that is higher than the first power level. In these and other embodiments, the optical detector 240 may measure the second noise level when optical data signals are being transmitted by the second amplifier 224 through the network elements 230. The second noise level may include the first noise level and NLI noise due to transmission of the filtered optical noise signal.

Figure 3C:
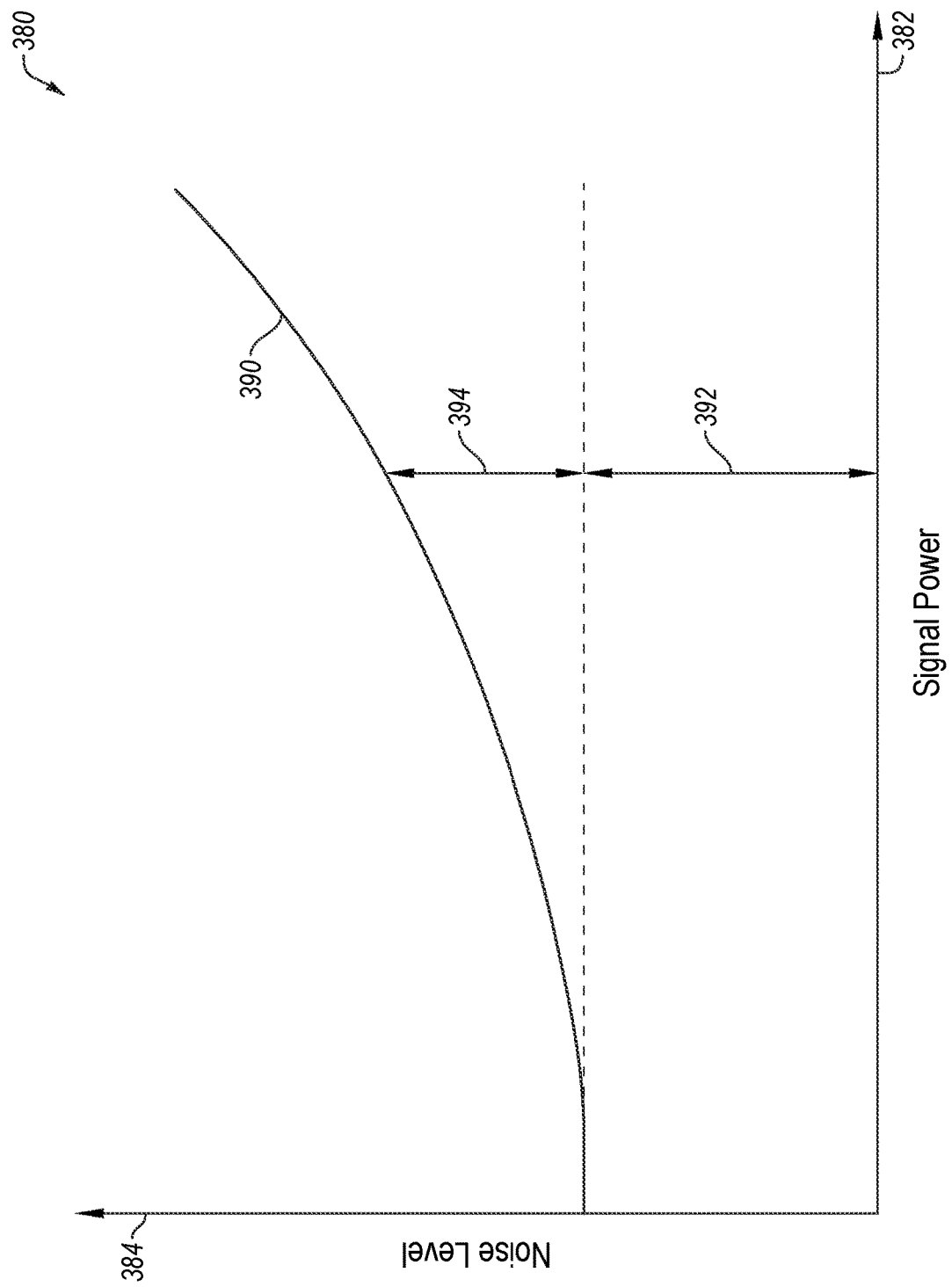

The first noise level and the second noise level are illustrated in FIG. 3C which illustrates an example optical signal diagram 380 of a total noise level with respect to signal power, according to at least one embodiment in the present disclosure. The diagram 380 may include an x-axis 382, a y-axis 384, a total noise level 390, a base line noise level 392, and an intra-channel noise level 394.

In some embodiments, the x-axis 382 may represent signal power of an optical signal in a frequency channel. In these and other embodiments, the y-axis 384 may represent a noise level of the frequency channel. Note that as the signal power of the optical signal increases that a noise level increases.

The total noise level 390 may be composed of the base line noise level 392 and the intra-channel noise level 394. In some embodiments, the base line noise level 392 may include an ASE noise. In these and other embodiments, when there are frequency channels with optical signal propagating the frequency channels that are adjacent to the frequency channel, the base line noise level 392 may also include an inter-channel NLI noise. Note that the base line noise level 392 may be consistent with a change in the signal power. For example, the base line noise level may be the first noise level measured by the optical detector 240. Alternately or additionally, the total noise level 390 may be the second noise level measured by the optical detector 240. In these and other embodiments, the intra-channel noise level 394 may be determined based on a difference between the total noise level 390 and the base line noise level 392.

The intra-channel noise level 394 may vary based on a change in the signal power. At lower signal power levels, the intra-channel noise level 394 may be zero. As the signal power increases, the intra-channel noise level 394 may also increase. In these and other embodiments, the intra-channel noise level 394 may have a non-linear relationship with the signal power. For example, the intra-channel noise level 394 may have a cubic relationship with the signal power. The intra-channel noise level 394 may be based on FWM noise of the frequency channel.

In some embodiments, the intra-channel noise level 394 may be related to an intra-channel NLI noise for the frequency channel. As described with respect to FIG. 5, the relationship between the intra-channel noise level 394 and the intra-channel NLI noise may be used to determine adjustment parameters.

Returning to the discussion of FIG. 2, in some embodiments, the optical detector 240 may measure the noise at the notch such that the noise level of the filtered optical noise signal does not affect the noise measurements. Further, the optical detector 240 may measure the second noise level while the filtered optical noise signal is being transmitted at the second noise level to capture the intra-channel noise that results from transmission of an optical signal along a frequency channel.

In some embodiments, a difference between the first noise level and the second noise level, e.g., a third noise level, such as the intra-channel noise level 394, may be determined. The third noise level may be related to a NLI noise level. Using an adjustment parameter configured to correlate intra-channel noise and NLI noise, an NLI noise level may be determined using the third noise level.

Modifications, additions, or omissions may be made to the optical network 200 without departing from the scope of the present disclosure. For example, in some embodiments, the optical network 200 may include additional data sources 212.

Figure 4:
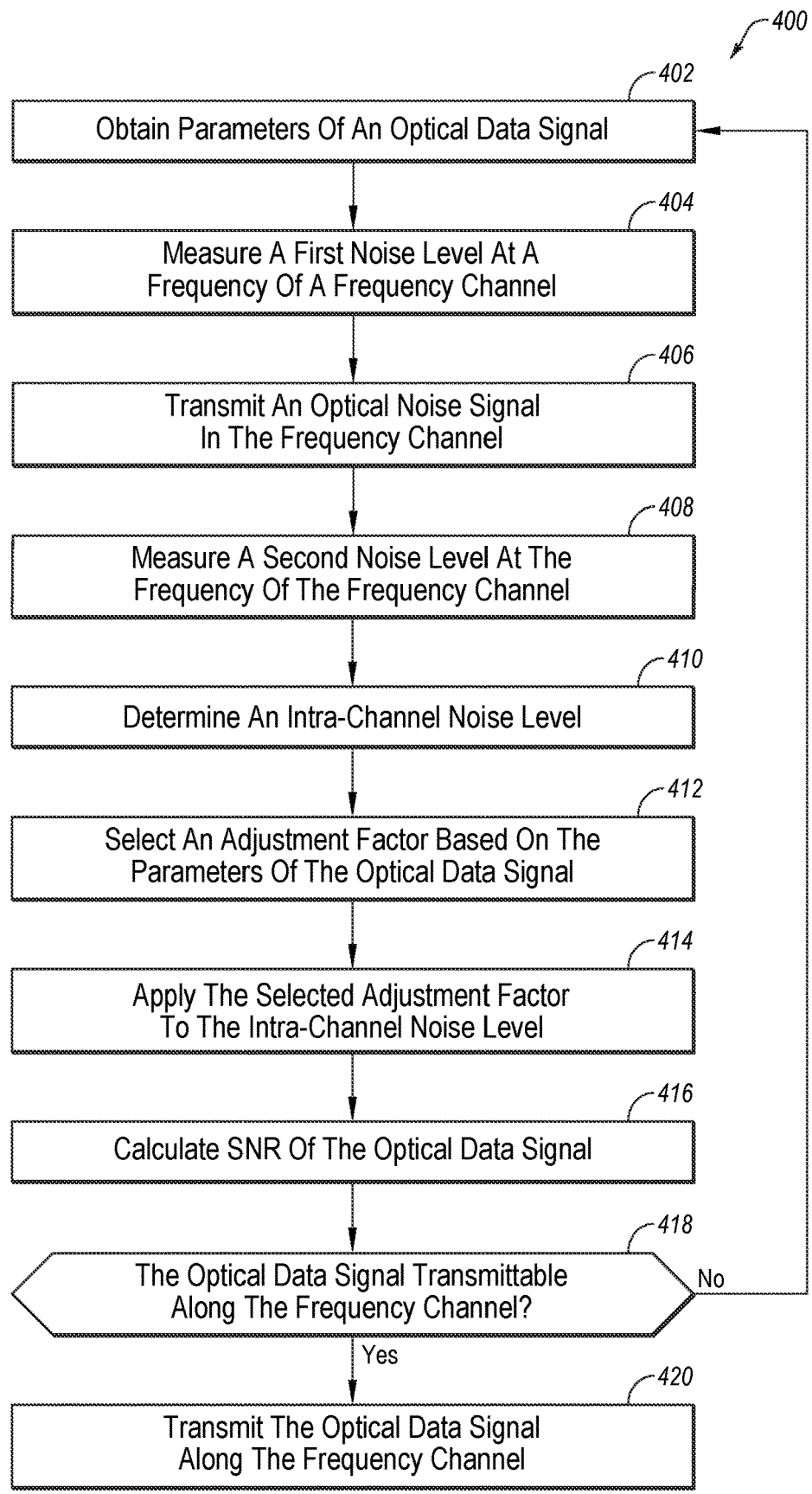
FIG. 4 illustrates a flowchart of an example method of optical noise estimation.

FIG. 4 illustrates a flowchart of an example method 400 of optical noise estimation. The method 400 may be arranged in accordance with at least one embodiment described in the present disclosure. One or more operations of the method 400 may be performed, in some embodiments, by a device or system, such as the noise estimation system 110 of FIG. 1, the system 700 of FIG. 7 or another device, combination of devices, system, or systems. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 402, where parameters of an optical data signal may be obtained. For example, an optical data signal may be considered for transmission along an optical path in an optical network. In these and other embodiments, the parameters may be based on the optical path and one or more requirements for data being carried by the optical data signal along the optical path. The parameters may include a modulation format, a baud rate, a transmission distance, and/or a transmission power level of the optical data signal.

At block 404, a first noise level at a frequency of a frequency channel may be measured. The first noise level may be measured at a frequency of a frequency channel in the optical path considered for the optical data signal. In some embodiments, a bandwidth of the frequency channel may be based on the baud rate in the selected set of parameters.

In some embodiments, the first noise level may be measured when no optical signal is being transmitted along the frequency channel. In these and other embodiments, one or more other optical signals, such as an optical data signal or an optical noise signal, may be transmitted in the optical path in frequency channels adjacent to the frequency channel in which the first noise level is measured.

Alternately or additionally, the first noise level may be measured when an optical noise signal is being transmitted along the frequency channel at a first power level. The optical noise signal may include a notch at the frequency at which the first noise level is measured. In these and other embodiments, the first power level of the optical noise signal may be less than the transmission power level of the selected set of parameters. In these and other embodiments, the first power level may be selected such that the intra-channel NLI noise is small. For example, the first power level may be low such that the intra-channel NLI noise is small enough to not be consider in a typical SNR calculation that may be used when making decisions about transmission of an optical signal.

In some embodiments, the first noise level may include an ASE noise of the frequency channel. Alternately or additionally, the first noise level may include NLI noise from adjacent frequency channels resulting from the one or more other optical signals transmitted in the optical path in the frequency channels adjacent to the frequency channel.

At block 406, an optical noise signal may be transmitted in the frequency channel. The optical noise signal may include a notch at the frequency at which the first noise level is measured. The optical noise signal may be transmitted at a second power level that may be equal to the transmission power level of the optical data signal. In these and other embodiments, the second power level may be greater than the first power level.

At block 408, a second noise level at the frequency in the frequency channel may be measured. The second noise level may include the ASE noise of the frequency channel, the NLI noise from adjacent frequency channels, and an intra-channel noise. In some embodiments, the intra-channel noise may be an FWM noise.

At block 410, an intra-channel noise level may be determined. The intra-channel noise level may be a difference between the first noise level and the second noise level.

At block 412, an adjustment factor may be selected for the intra-channel noise level. The adjustment factor may be selected based on the parameters of an optical data signal. For example, the adjustment factor may be selected from multiple adjustment factors based on the adjustment factor being determined using parameters that correspond to the parameters of the optical data signal.

At block 414, the selected adjustment factor may be applied to the intra-channel noise level. In these and other embodiments, application of the selected adjustment factor to the intra-channel noise level may produce an NLI noise level. The NLI noise level may be used along with the first noise level to calculate an SNR of the optical data signal.

At block 416, a SNR of the optical data signal may be calculated. The SNR may be calculated based on the channel power, the first noise level, and the NLI noise levels. In these and other embodiments, the calculated SNR of the optical data signal may be an estimated SNR of the optical data signal that accounts for ASE noise of the optical path, NLI noise from neighboring frequency channels in the optical path, and intra-channel NLI noise in the frequency channel.

For example, in some embodiments, the SNR may be calculated based on the power of the signal, such as the second power level, divided by the first noise summed with the third noise. In these and other embodiments, the first noise may be adjusted based on the bandwidth of the notch and the bandwidth of the optical noise signal. For example, the SNR may be represented by the following equation:

$$SNR = \frac{\text{Channel Power}}{P_{BLN}\frac{B_s}{B_m} + \text{IntraChannel NLI noise}}$$

where Channel Power is the power of the optical noise signal at the second power level, $P_{BLN}$ is the first noise level, $B_s$ is the bandwidth of the optical noise signal, $B_m$ is the bandwidth of the notch, and IntraChannel NLI noise is the NLI noise level calculated from the third noise level with the applied adjustment factor.

At block 418, it may be determined if the optical data signal may be transmitted along the frequency channel. For example, a minimum SNR may be obtained for the optical data signal to be transmitted along the frequency channel. The minimum SNR may be based on the data requirements for the optical data signal. The minimum SNR may be compared with the calculated SNR. In response to the calculated SNR being greater than the minimum SNR, the optical data signal may be transmitted along optical path.

In response to determining that the optical data signal may be transmitted along the frequency channel, the method proceeds to block 420. In response to determining that the optical data signal may not be transmitted along the frequency channel, the method returns to block 402. In block 402, a different optical data signal with different parameters, such as a different modulation format, may be obtained and the method 400 may continue.

At block 420, the optical data signal may be transmitted along the frequency channel.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 400 may not proceed to block 420 after determining one optical data signal that may be transmitted along the frequency channel.

In these and other embodiments, the method 400 may determine a SNR for each of multiple different candidate optical data signals and select the optical data signal with the highest SNR for transmission in block 420.

Figure 5:
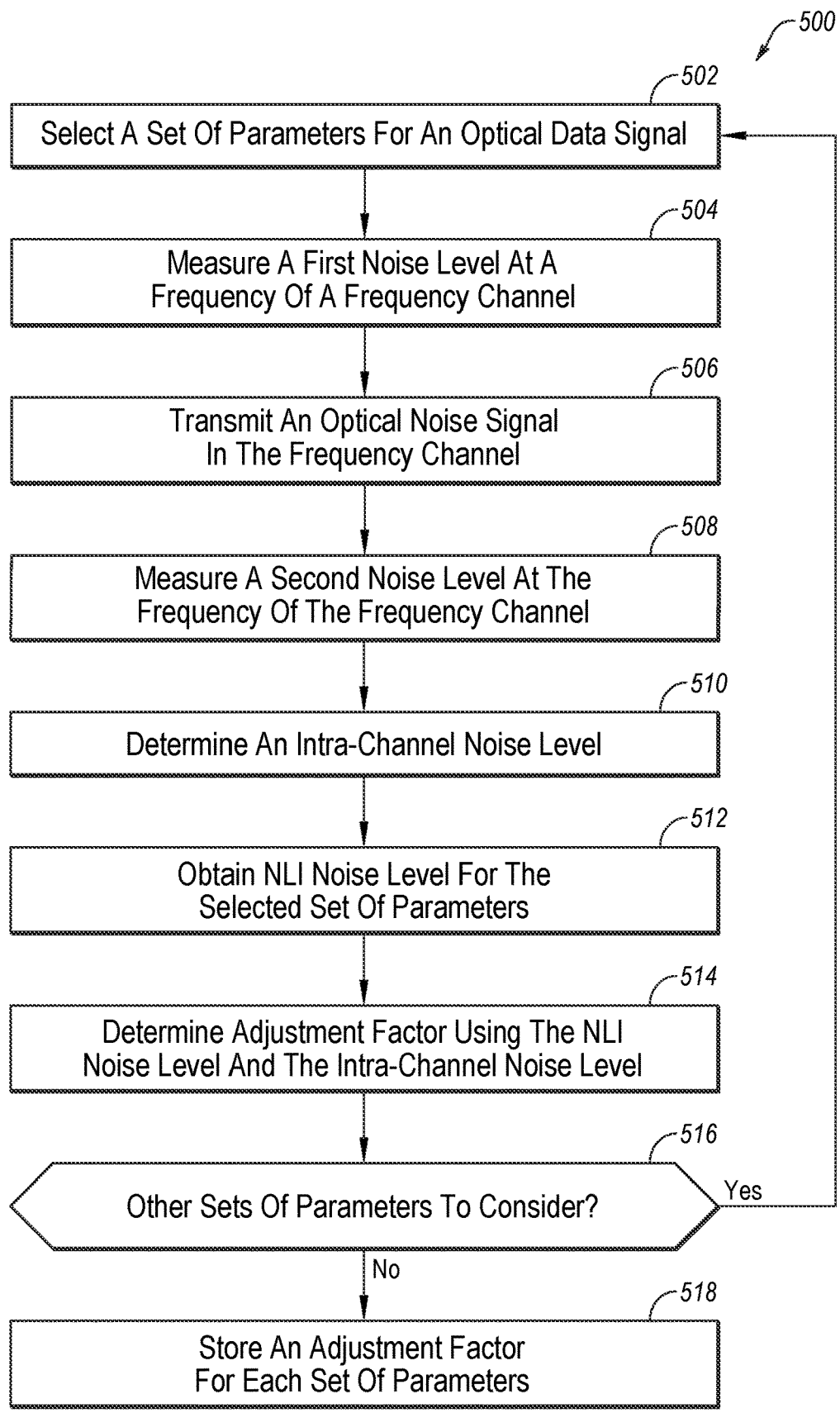
FIG. 5 illustrates a flowchart of an example method of adjustment factor determination.

FIG. 5 illustrates a flowchart of an example method 500 of adjustment factor determination. The method 500 may be arranged in accordance with at least one embodiment described in the present disclosure. One or more operations of the method 500 may be performed, in some embodiments, by a device or system, such as the noise estimation system 110 of FIG. 1, the system 700 of FIG. 7 or another device, combination of devices, system, or systems. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 502, a set of parameters for an optical data signal may be selected. In some embodiments, parameters that may be included in a set of parameters may include a transmission power level, a modulation format, a baud rate, and a transmission distance for the optical data signal.

At block 504, a first noise level at a frequency of a frequency channel may be measured. The first noise level may be measured in an optical path that includes the frequency channel in an optical network. In some embodiments, a bandwidth of the frequency channel may be based on the baud rate in the selected set of parameters.

In some embodiments, the first noise level may be measured when no optical signal is being transmitted along the frequency channel. In these and other embodiments, one or more other optical signals, such as an optical data signal or an optical noise signal, may be transmitted in the optical path in frequency channels adjacent to the frequency channel in which the first noise level is measured.

Alternately or additionally, the first noise level may be measured when an optical noise signal is being transmitted along the frequency channel at a first power level. The optical noise signal may include a notch at the frequency at which the first noise level is measured. In these and other embodiments, the first power level of the optical noise signal may be less than the transmission power level of the selected set of parameters. In these and other embodiments, the first power level may be selected such that intra-channel NLI noise is small.

In some embodiments, the first noise level may include an ASE noise of the frequency channel. Alternately or additionally, the first noise level may include NLI noise from adjacent frequency channels resulting from the one or more other optical signals transmitted in the optical path in the frequency channels adjacent to the frequency channel.

At block 506, an optical noise signal may be transmitted in the frequency channel. The optical noise signal may include a notch at the frequency at which the first noise level is measured. The optical noise signal may be transmitted at a second power level that may be equal to the transmission power level of the selected set of parameters. In these and other embodiments, the second power level may be greater than the first power level.

At block 508, a second noise level at the frequency in the frequency channel may be measured. The second noise level may include the ASE noise of the frequency channel, the NLI noise from adjacent frequency channels, and an intra-channel noise. In some embodiments, the intra-channel noise may be an FWM noise. The FWM noise may be proportional to intra-channel NLI noise.

At block 510, an intra-channel noise level may be determined. The intra-channel noise level may be a difference between the first noise level and the second noise level.

At block 512, an NLI noise level for the selected set of parameters may be obtained. In some embodiments, the NLI noise level may be obtained from a theoretical calculation using the selected set of parameters. Alternately or additionally, the NLI noise level may be obtained from other means, such as from an optical network or test bed configured to obtain NLI noise levels.

At block 514, an adjustment factor may be determined using the NLI noise level and the intra-channel noise level. In some embodiments, the adjustment factor may be determined based on correlations between the NLI noise level and the intra-channel noise level. In these and other embodiments, the adjustment factor may be determined such that the adjustment factor when applied to the intra-channel noise level results in the corresponding NLI noise level. For example, the adjustment factor may be a ratio that may be applied to the intra-channel noise level to obtain the NLI noise level.

At block 516, it may be determined if there are other sets of parameters to consider. Other sets of parameters may be considered based on parameters that may be considered for optical data signals in optical networks. For example, all other sets of parameters may be considered. Alternately or additionally, only some sets of parameters may be considered, such as sets of parameters for optical data signals that are regularly employed in optical networks. Alternately or additionally, some subsets of parameters may be considered, and adjustment factors may be extrapolated based on the considered subsets of parameters. For example, in some embodiments, the intra-channel noise level may have a cubic relationship with transmission power levels. In these and other embodiments, the adjustment factor for many power levels may be extrapolated based on data from a fewer number of power levels.

In response to there being other sets of parameters to consider, the method 500 may proceed back to block 502 to select another set of parameters. In response to there being no other sets of parameters to consider, the method 500 may proceed to block 518.

At block 518, an adjustment factor may be stored for each set of parameters. The stored adjustment factors may be used to determine an NLI noise level based on a calculated intra-channel noise level, such as the application of an adjustment factor to an intra-channel noise level at block 414 of FIG. 4. Note that the optical network used to determine the adjustment factor may not be the same as the optical network for which a SNR is being determined, such as the optical network used in FIG. 4. The same optical network may not be used because the first noise level, or the base line noise level as illustrated in FIG. 3, is not the basis for the adjustment parameters. Its contribution to the second noise level is removed and thus the first noise level, which may vary from optical network to optical network, is removed and does not result in a change to the adjustment factor.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiment the method 500 may include repeating one or more of blocks 506, 508, and 510 such that the intra-channel noise level used in block 514 to determine the adjustment factor is based on multiple measurements of the intra-channel noise level for a given set of parameters. In these and other embodiments, a value of the intra-channel noise level used to determine the adjustment factor may be a mathematical combination of the multiple measurements of the intra-channel noise level, such as a mean, medium, or weighted mean, among others.

Figure 6:
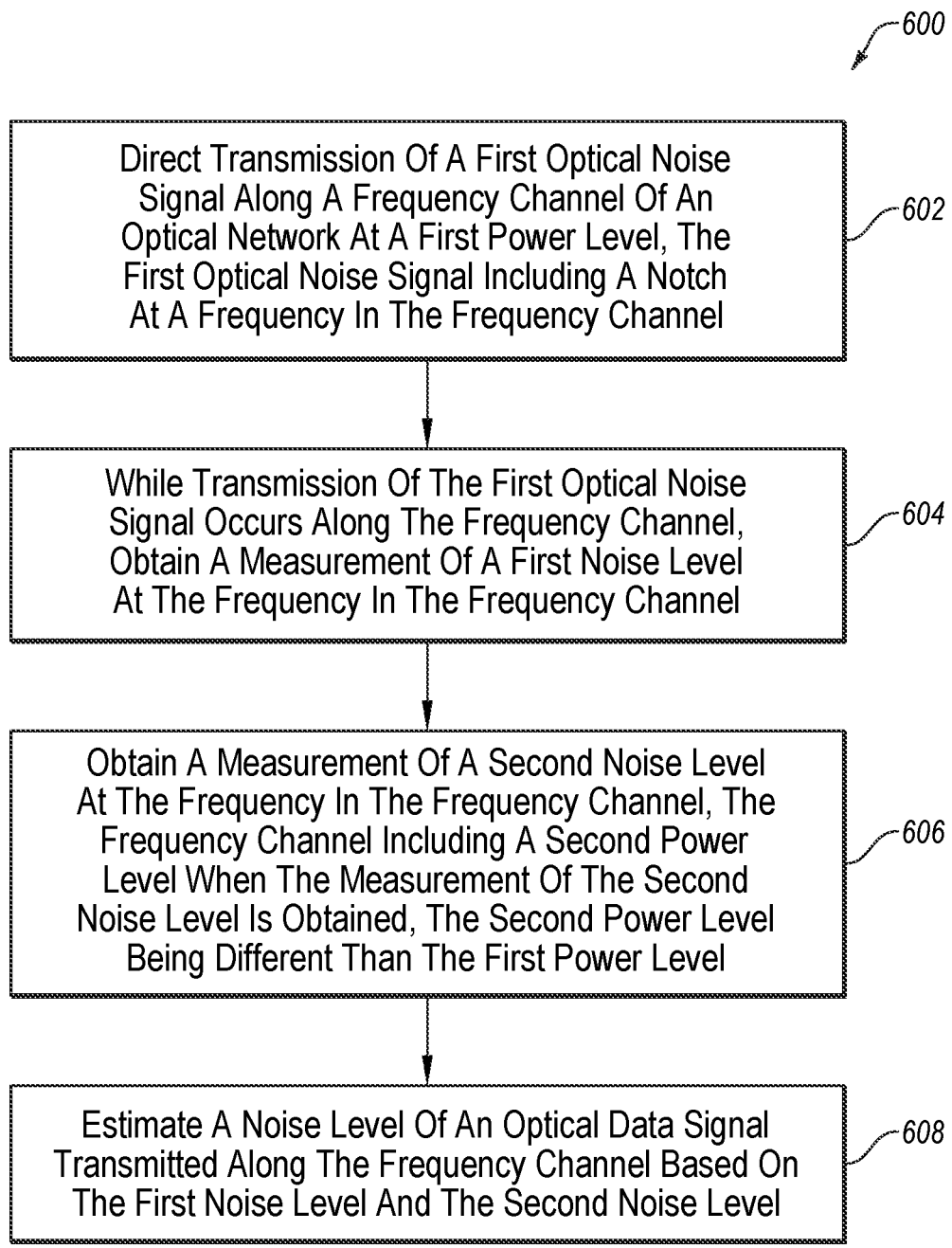
FIG. 6 illustrates a flowchart of another example method of optical noise estimation.

FIG. 6 illustrates a flowchart of another example method 600 of optical noise estimation. The method 600 may be arranged in accordance with at least one embodiment described in the present disclosure. One or more operations of the method 600 may be performed, in some embodiments, by a device or system, such as the noise estimation system 110 of FIG. 1 and the system 700 of FIG. 7 or another device, combination of devices, system, or systems. In these and other embodiments, the method 600 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 602, where transmission may be directed of a first optical noise signal along a frequency channel of an optical network at a first power level. In some embodiments, the first optical noise signal may include a notch at a frequency in the frequency channel.

At block 604, while transmission of the first optical noise signal occurs along the frequency channel, a measurement of a first noise level at the frequency in the frequency channel may be obtained. In some embodiments, the measurement of the first noise level may be obtained when transmission is occurring of one or more other optical data signals in secondary frequency channels that are adjacent to the frequency channel in the optical network.

At block 606, a measurement of a second noise level of the frequency in the frequency channel may be obtained. In these and other embodiments, the frequency channel may include a second power level when the measurement of the second noise level is obtained. Alternately or additionally, the second power level may be different than the first power level. In these and other embodiments, the measurement of the second noise level may be obtained when transmission is occurring of one or more other optical data signals in secondary frequency channels that are adjacent to the frequency channel in the optical network.

At block 608, a noise level of an optical data signal transmitted along the frequency channel based on the first noise level and the second noise level may be estimated.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 600 may further include determining a third noise level based on a difference between the first noise level and the second noise level. In these and other embodiments, the noise level of the optical data signal may be estimated based on the first noise level and the third noise level.

In some embodiments, the method 600 may further include applying an adjustment factor to the third noise level. In these and other embodiments, the adjustment factor may be selected based on one or more parameters of the optical data signal. In these and other embodiments, the noise level of the optical data signal may be estimated based on the first noise level and the third noise level with the applied adjustment factor.

In some embodiments, the one or more parameters may be one or more of a modulation format, a baud rate, and a transmission distance of the optical data signal. Alternately or additionally, the adjustment factor may be based on correlations between noise levels of optical data signals that include particular parameters of the one or more parameters and noise levels calculated using optical noise signals.

In some embodiments, the method 600 may further include transmitting the optical data signal along the frequency channel. In these and other embodiments, a modulation format of the transmitted optical data signal may be selected based on the estimated noise level.

Figure 7:
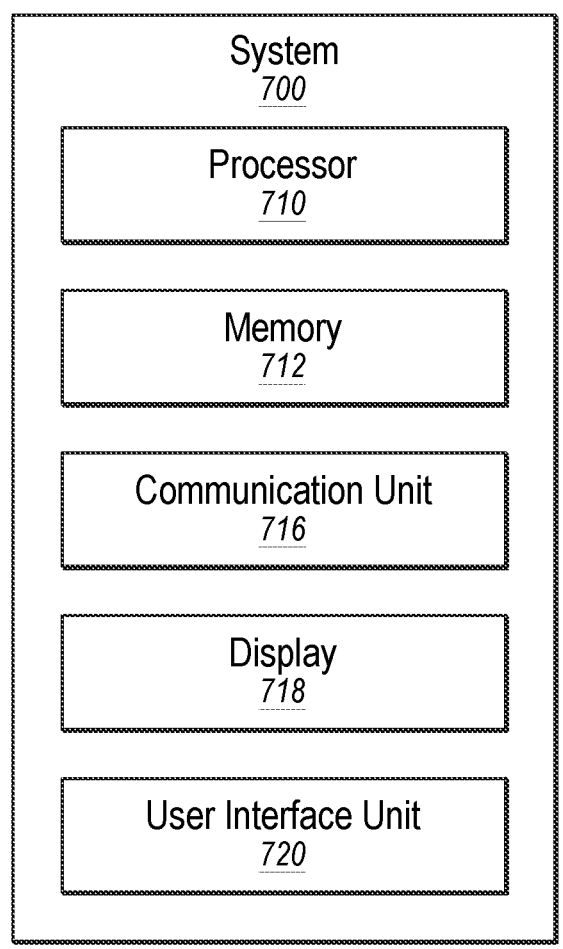
FIG. 7 illustrates an example system that may be used for optical noise estimation.

FIG. 7 is a block diagram illustrating an example system 700 that may be used for optical noise estimation, according to at least one embodiment of the present disclosure. The system 700 may include a processor 710, memory 712, a communication unit 716, a display 718, and a user interface unit 720, which all may be communicatively coupled. In some embodiments, the system 700 may be used to perform one or more of the methods described in this disclosure.

For example, the system 700 may be used to perform one or more of the methods described in FIGS. 4, 5, and 6. Alternately or additionally, the system 700 or parts of the system 700 may be part of the noise estimation system 110 of FIG. 1.

Generally, the processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 7, it is understood that the processor 710 may include any number of processors distributed across any number of networks or physical locations that are configured to perform individually or collectively any number of operations described herein. In some embodiments, the processor 710 may interpret and/or execute program instructions and/or process data stored in the memory 712. In some embodiments, the processor 710 may execute the program instructions stored in the memory For example, in some embodiments, the processor 710 may execute program instructions stored in the memory 712 that are related to task execution such that the system 700 may perform or direct the performance of the operations associated therewith as directed by the instructions. In these and other embodiments, the instructions may be used to perform one or more blocks of method 400, 500, or 600 of FIGS. 4-6.

The memory 712 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 710.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 710 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 716 may include any component, device, system, or combination thereof that is configured to transmit or receive information over a network. In some embodiments, the communication unit 716 may communicate with other devices at other locations, the same location, or even other components within the same system. For example, the communication unit 716 may include a modem, a network card (wireless or wired), an infrared communication device, a wireless communication device (such as an antenna), and/or chipset (such as a Bluetooth® device, an 802.6 device (e.g., Metropolitan Area Network (MAN)), a WiFi device, a WiMax device, cellular communication facilities, etc.), and/or the like. The communication unit 716 may permit data to be exchanged with a network and/or any other devices or systems described in the present disclosure.

The display 718 may be configured as one or more displays, like an LCD, LED, Braille terminal, or other type of display. The display 718 may be configured to present video, text captions, user interfaces, and other data as directed by the processor 710.

The user interface unit 720 may include any device to allow a user to interface with the system 700. For example, the user interface unit 720 may include a mouse, a track pad, a keyboard, buttons, camera, and/or a touchscreen, among other devices. The user interface unit 720 may receive input from a user and provide the input to the processor 710. In some embodiments, the user interface unit 720 and the display 718 may be combined.

Modifications, additions, or omissions may be made to the system 700 without departing from the scope of the present disclosure. For example, in some embodiments, the system 700 may include any number of other components that may not be explicitly illustrated or described. Further, depending on certain implementations, the system 700 may not include one or more of the components illustrated and described.

As indicated above, the embodiments described herein may include the use of a special purpose or general-purpose computer (e.g., the processor 710 of FIG. 7) including various computer hardware or software modules, as discussed in greater detail below. Further, as indicated above, embodiments described herein may be implemented using computer-readable media (e.g., the memory 712 of FIG. 7) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of optical noise estimation, the method comprising:
   directing transmission of a first optical noise signal along a frequency channel of an optical network at a first power level, the first optical noise signal including a notch at a frequency in the frequency channel;
   while transmission of the first optical noise signal occurs along the frequency channel, obtaining a measurement of a first noise level at the frequency in the frequency channel;
   obtaining a measurement of a second noise level at the frequency in the frequency channel, the frequency channel including a second power level when the measurement of the second noise level is obtained, the second power level being different than the first power level;
   determining an intra-channel noise level based on a difference between the first noise level and the second noise level;
   applying an adjustment factor to the intra-channel noise level, the adjustment factor determined based on a correlation between non-linear interference noise and intra-channel noise; and
   estimating a noise level of an optical data signal transmitted along the frequency channel based on the first noise level and the adjusted intra-channel noise level.

2. The method of claim 1, wherein the measurement of the first noise level and the measurement of the second noise level are obtained when transmission is occurring of one or more other optical data signals in secondary frequency channels that are adjacent the frequency channel in the optical network.

3. The method of claim 1, wherein the non-linear interference noise is based on one or more optical signal parameters and the intra-channel noise is based on the one or more optical signal parameters and the optical data signal includes the one or more optical signal parameters.

4. The method of claim 3, further comprising selecting the adjustment factor from a plurality of adjustment factors based on the one or more optical signal parameters.

5. The method of claim 3, wherein the one or more optical signal parameters is one or more of a modulation format, a baud rate, and a transmission distance of the optical data signal.

6. The method of claim 4, wherein each of the plurality of adjustment factors corresponds to a different set of optical signal parameters, the method further comprising:
   before directing transmission of the first optical noise signal and before obtaining the measurement of the second noise level, determining the plurality of adjustment factors, wherein determining one of the plurality of adjustment factors includes:
   selecting a set of optical signal parameters;
   determining an intra-channel noise level of an optical test signal with the set of optical signal parameters;
   obtaining a non-linear interference noise level of the optical test signal; and
   correlating the intra-channel noise level and the non-linear interference noise level to determine the one of the plurality of adjustment factors for the set of optical signal parameters.

7. The method of claim 1, further comprising transmitting the optical data signal along the frequency channel, wherein a modulation format of the transmitted optical data signal is selected based on the estimated noise level.

8. One or more non-transitory computer readable media configured to store instructions, that when executed by a system cause the system to perform operations, the operations comprising:
   directing transmission of a first optical noise signal along a frequency channel of an optical network at a first power level, the first optical noise signal including a notch at a frequency in the frequency channel;
   while transmission of the first optical noise signal occurs along the frequency channel, obtaining a measurement of a first noise level at the frequency in the frequency channel;
   obtaining a measurement of a second noise level at the frequency in the frequency channel, the frequency channel including a second power level when the measurement of the second noise level is obtained, the second power level being different than the first power level;
   determining an intra-channel noise level based on a difference between the first noise level and the second noise level;
   applying an adjustment factor to the intra-channel noise level, the adjustment factor determined based on a correlation between non-linear interference noise and intra-channel noise; and
   estimating a noise level of an optical data signal transmitted along the frequency channel based on the first noise level and the adjusted intra-channel noise level.

9. The non-transitory computer readable media of claim 8, wherein the measurement of the first noise level and the measurement of the second noise level are obtained when transmission is occurring of one or more other optical data signals in secondary frequency channels that are adjacent the frequency channel in the optical network.

10. The non-transitory computer readable media of claim 8, wherein the non-linear interference noise is based on one or more optical signal parameters and the intra-channel noise is based on the one or more optical signal parameters and the optical data signal includes the one or more optical signal parameters.

11. The non-transitory computer readable media of claim 10, further comprising selecting the adjustment factor from a plurality of adjustment factors based on the one or more optical signal parameters.

12. The non-transitory computer readable media of claim 10, wherein the one or more optical signal parameters is one or more of a modulation format, a baud rate, and a transmission distance of the optical data signal.

13. The non-transitory computer readable media of claim 11, wherein before directing transmission of the first optical noise signal and before obtaining the measurement of the second noise level, determining the adjustment factors, wherein determining the adjustment factors includes:
selecting a set of optical signal parameters;
determining an intra-channel noise level of an optical test signal with the set of optical signal parameters;
obtaining a non-linear interference noise level of the optical test signal; and
correlating the intra-channel noise level and the non-linear interference noise level to determine the adjustment factor for the set of optical signal parameters, wherein the set of optical signal parameters includes the one or more optical signal parameters.

14. The non-transitory computer readable media of claim 8, further comprising directing transmission of the optical data signal along the frequency channel, wherein a modulation format of the transmitted optical data signal is selected based on the estimated noise level.

15. An optical system comprising:
an optical network that includes a plurality of frequency channels, the optical network including:
an optical filter configured to filter a first optical noise signal on a frequency channel of the plurality of frequency channels to include a notch at a frequency in the frequency channel;
an optical detector configured to:
measure, at the frequency, a first noise level at the frequency in the frequency channel when the first optical noise signal is transmitted at a first power level, and
measure a second noise level at the frequency in the frequency channel, the frequency channel including a second power level, which is different than the first power level, when measuring the second noise level; and
a processor configured to:
determine an intra-channel noise level based on a difference between the first noise level and the second noise level;
apply an adjustment factor to the intra-channel noise level, the adjustment factor determined based on a correlation between non-linear interference noise and intra-channel noise; and
estimate a noise level of an optical data signal transmitted along the frequency channel based on the first noise level and the adjusted intra-channel noise level.

16. The optical system of claim 15, the measurement of the first noise level and the measurement of the second noise level occur when transmission is occurring of one or more other optical data signals in secondary frequency channels of the plurality of frequency channels that are adjacent the frequency channel.

17. The optical system of claim 15, wherein the non-linear interference noise is based on one or more optical signal parameters and the intra-channel noise is based on the one or more optical signal parameters and the optical data signal includes the one or more optical signal parameters.

18. The optical system of claim 17, further comprising selecting the adjustment factor from a plurality of adjustment factors based on the one or more optical signal parameters.

19. The optical system of claim 17, wherein the one or more optical signal parameters is one or more of a modulation format, a baud rate, and a transmission distance of the optical data signal.

20. The optical system of claim 18, wherein
before directing transmission of the first optical noise signal and before obtaining the measurement of the second noise level, determining the adjustment factors, wherein the processor is further configured to:
select a set of optical signal parameters;
determine an intra-channel noise level of an optical test signal with the set of optical signal parameters;
obtain a non-linear interference noise level of the optical test signal; and
correlate the intra-channel noise level and the non-linear interference noise level to determine the adjustment factor for the set of optical signal parameters, wherein the set of optical signal parameters includes the one or more optical signal parameters.

* * * * *